April 25, 1950
L. T. SACHTLEBEN
2,505,505
MOTION-PICTURE PROJECTION APPARATUS WITH
ADJUSTABLE MIRROR MEANS
Filed July 10, 1945
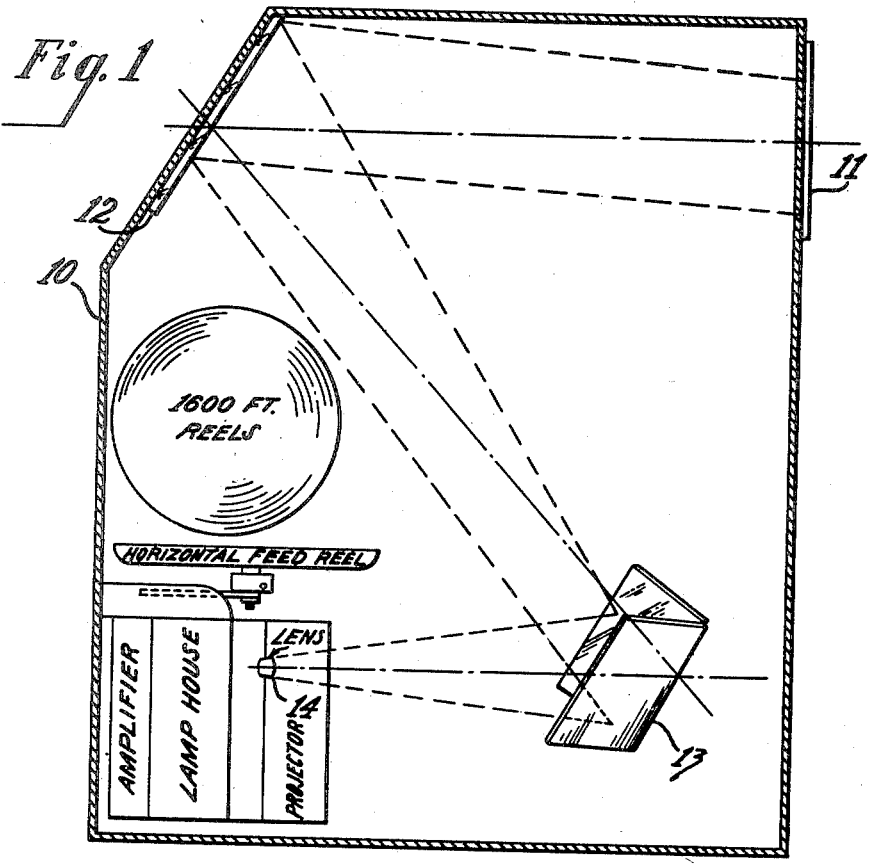
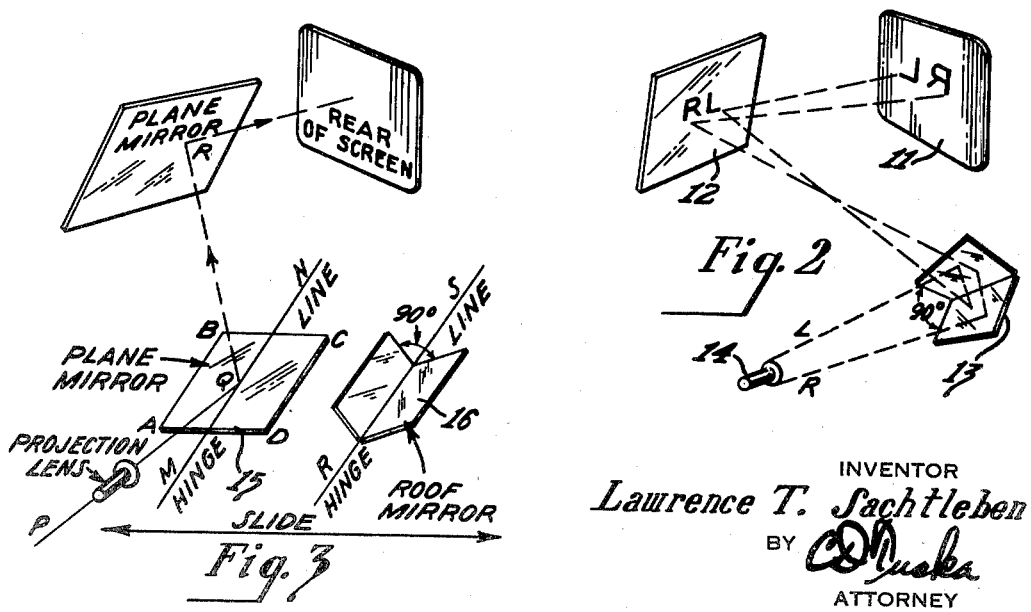
INVENTOR
Lawrence T. Sachtleben
BY
ATTORNEY Patented Apr. 25, 1950

2,505,505

UNITED STATES PATENT OFFICE 2,505,505

MOTION-PICTURE PROJECTION APPARATUS WITH ADJUSTABLE MIRROR MEANS

Lawrence T. Sachtleben, Indianapolis, Ind., assignor to Radio Corporation of America, a corporation of Delaware Application July 10, 1945, Serial No. 604,197

1 Claim. (Cl. 88—24)

The present invention relates to rear screen motion picture projection apparatus and more particularly to an optical system capable of projecting either prints specially prepared for rear projection or prints for front projection in association with a novel lateral reversing of the image.

In projection apparatus such, for example, as equipment designed to project a picture on the rear of a screen for viewing the picture on the front of the screen, it has heretofore been the practice to employ special laterally reversed prints to compensate for the lateral reversal of the picture resulting from the rear screen projection. Where front projection prints are to be used for rear projection, it has been proposed to employ a "Dove" prism in front of the projection lens in order to obtain the required lateral reversal of the image. Such prisms have not, however, been satisfactory owing to size, weight and cost, and because approximately fifty percent light loss must be accepted, due to the inherently restricted aperture of the "Dove" prism, unless size and weight are increased beyond an acceptable or practical limit. Furthermore, mounting the prism on the front of the projection lens subjects the prism to rotation, when the lens is rotated for focusing, and causes double the rotation of the projected image which is a serious objection to such mounting. This objection may be avoided by mounting the prism away from the lens but then the rapidly diverging light beam requires an increase in the size of the prism. In addition to all of these disadvantages of prism use in projection apparatus, it has been found that the oblique refraction of the light as it enters and leaves the thick prism introduces astigmatism and color into the picture. Also, there is a prohibitive amount of aberration.

Some of the objects of the present invention are: to provide an improved optical system for use in rear screen projection apparatus; to provide an optical system wherein prints designed for front projection use can be laterally reversed for rear screen projection; to provide an optical system for projection apparatus wherein provision is made for interchangeable projection of rear screen specially prepared prints, and front screen projection prints; to provide means for laterally reversing the projected image in a rear screen projection and front viewing equipment; and to provide other improvements as will hereinafter appear.

In the accompanying drawing,

Figure 1 represents a sectional elevation of a rear screen projection cabinet equipped with an optical system embodying one form of the present invention, Figure 2 is a diagram of an optical projection system embodying the form of the invention shown in Fig. 1, and Figure 3 is a diagram of an interchangeable optical system embodying a modification of the invention.

Referring to the drawings, one form of the invention is shown in Fig. 1 wherein a cabinet 10 houses the usual film reel, sound and light equipment and projector for the light beam, all of which is arranged in the bottom portion of the housing. Vertically disposed in the upper portion of the front of the cabinet 10 is the screen 11 which is horizontally juxtaposed to a reflecting mirror 12 arranged at the proper angle to receive a reflected image for transfer to the screen in correct position for viewing by anyone in front of the screen.

In order to obtain lateral reversing of the picture on the screen 11 the preferred construction is to mount a "roof" mirror 13, as shown in Fig. 1, in the path of the light beam from the projecting lens 14. This mirror 13 thus takes the place of the usual plane mirror used for rear screen projection of specially prepared prints. The roof mirror 13 could also be placed as a substitute for the mirror 12 at the top portion of the cabinet to obtain the same reversed result. This roof mirror 13 comprises a pair of plane, front surfaced mirrors set at an angle of 90° to each other and mounted in the optical train in such a manner that the line of intersection of the two mirrors will lie in the same plane as that which would coincide with a plane mirror located to reflect the projected picture upward to the mirror 12. Also, the plane bisecting the roof angle between the mirrors will be vertical and contain the axis of the projection lens. Thus, the image upon the screen will be reversed without changing its condition of focus or its location upon the screen. As shown in Fig. 2, half of the light L passes from the projection lens to the left side of the roof mirror 13, thence to the right side, then to the plane mirror 12 in lateral reversed position, where it is reflected to the screen in its original position. The other half of the light R passes from the projection lens to the right side of the roof mirror 13, thence to the left side, then to the plane mirror in lateral reversed position where it is reflected to the screen in its original position. Each half of the light thus is directed into an independent reversed image. The two images, however, exactly coincide laterally when the angle between the two sides of the roof mirror 13 is 90°.

For the purpose of using the projection apparatus for both rear projection pictures and front projection pictures, the form of the invention shown in Fig. 3 makes possible an interchange of a plane reflecting mirror 15 with a roof mirror 16 or vice versa. The two mirrors 15 and 16 are mounted on a common plate to slide horizontally until one or the other assumes its correct position for reflecting the image. The line RS of the roof mirror 16 must be in the plane ABCD and the mirror 16 must slide parallel to this plane. Furthermore, the plane bisecting the "roof" angle, must be parallel to the plane PQR. When the "roof" mirror 16 has thus taken the place of the plane mirror 15, the action in reflecting the reversed image is the same as described in connection with Fig. 1, and the apparatus is ready for use with front projection pictures. By sliding the two mirrors 15 and 16 to replace the "roof" mirror with the plane mirror, the apparatus can then be used for rear projection pictures. The two assemblies in this form of the invention are independently adjustable on a common mounting plate, which in turn can slide horizontally between adjustable fixed stops to bring either assembly into working position. Each assembly should be capable of rotation about mutually perpendicular horizontal axes, of which one coincides with the projector's optical axis, while the other should intersect it as nearly as practicable. When the two assemblies are correctly adjusted, the ridge line of the roof should lie in the reflecting surface of the plane mirror within about $\frac{1}{32}$ inch. This is important because it permits reversal of the picture without requiring any refocusing.

Another form of the invention is to use a mirror made in two halves which are hinged so that the halves can be swung to either a 180° same plane position, or a 90° position. In the former the mirror becomes a plane mirror for use with rear projection pictures, and in the latter becomes a "roof" mirror for front projection pictures. The adjustment of the sides of the roof about the ridge line must be independent and capable of being secured in position to an accuracy of twelve seconds of arc if the two pictures are to be maintained coincident within 1/64 inch on the screen, when the screen is approximately 68" from the ridge line of the mirrors. Preferably a spring hinge or spring-loaded hinge will be employed.

From the foregoing it will be evident that the novel roof mirror construction has the following advantages: the reversing means is independent of the projector; the reversing means will operate equally well with projection lenses of any speed or focal length; projection efficiencies for direct and reverse projection will be equal within ten percent with clean mirrors; the picture may be reversed without disturbing projection focus or requiring refocusing; projection focus may be adjusted at all times without affecting picture position; the reversing means will introduce no loss of picture quality; and the picture may be reversed without stopping projector or more than momentary interruption of projection.

I claim as my invention:

A projection apparatus comprising the combination of a screen, means including a lens and light system for projecting pictures, and means including a device for reflecting the image of a projected picture upon said screen as a normal image, said device comprising two mirrors hinged together for adjustment into either a plane mirror or a roof mirror according to whether a front or a rear position picture is projected.

LAWRENCE T. SACHTLEBEN.

REFERENCES CITED

The following references are of record in the file of this patent:

UNITED STATES PATENTS

| Number | Name | Date |
|---|---|---|
| 1,954,787 | Bright et al. | Apr. 17, 1934 |
| 2,022,903 | Thomas | Dec. 3, 1935 |
| 2,064,368 | Bausch et al. | Dec. 15, 1936 |
| 2,074,991 | Saleedo | Mar. 23, 1937 |
| 2,100,442 | Hermann | Nov. 30, 1937 |
| 2,231,395 | Schlegel | Feb. 11, 1941 |
| 2,250,174 | Bancroft | July 22, 1941 |
| 2,310,273 | Bancroft | Feb. 9, 1943 |
| 2,330,799 | Coker et al. | Oct. 5, 1943 |